United States Patent [19]

Carter et al.

[11] Patent Number: 4,891,191
[45] Date of Patent: Jan. 2, 1990

[54] HIGH EFFICIENCY COLUMN CRYSTALLIZER

[75] Inventors: Don E. Carter, Creve Coeur; Yung C. Hsu, Chesterfield; Jason J. Tang, Maryland Heights, all of Mo.

[73] Assignee: Monsanto Company, St. Louis, Mo.

[21] Appl. No.: 728,462

[22] Filed: May 1, 1985

Related U.S. Application Data

[63] Continuation of Ser. No. 558,142, Dec. 5, 1983, abandoned.

[51] Int. Cl.[4] .............................................. B01D 9/00
[52] U.S. Cl. .................................. 422/254; 422/251; 422/273
[58] Field of Search .................... 422/251, 254, 245; 62/532, 538, 539, 544; 209/254, 300

[56] References Cited

U.S. PATENT DOCUMENTS

| | | | |
|---|---|---|---|
| 2,823,242 | 2/1958 | McKay | 62/538 |
| 3,501,275 | 3/1970 | Sailer et al. | 23/300 |
| 4,257,796 | 3/1981 | Arkenbout | 62/538 |

FOREIGN PATENT DOCUMENTS

| | | |
|---|---|---|
| 34852 | 9/1981 | European Pat. Off. . |
| 1365536 | 9/1974 | United Kingdom . |
| 2089230 | 6/1982 | United Kingdom . |

OTHER PUBLICATIONS

Arkenbout, G. J. et al., "A Crystallization Column and Method for Performing a Crystallization in Such a Column", European Patent Application, publication #0034852, 9/2/81.

Primary Examiner—Gary P. Straub
Attorney, Agent, or Firm—Dennis R. Hoerner, Jr.; James W. Williams, Jr.; Arnold H. Cole

[57] ABSTRACT

An improved countercurrent solid-liquid contacting apparatus, and more particularly an improved countercurrent crystallizer column is disclosed. The present invention embraces the discover that column efficiency and product purity can be substantially enhanced by reducing axial liquid back-mixing by using stationary solid beds and transport means at spaced intervals along the column length.

13 Claims, 2 Drawing Sheets

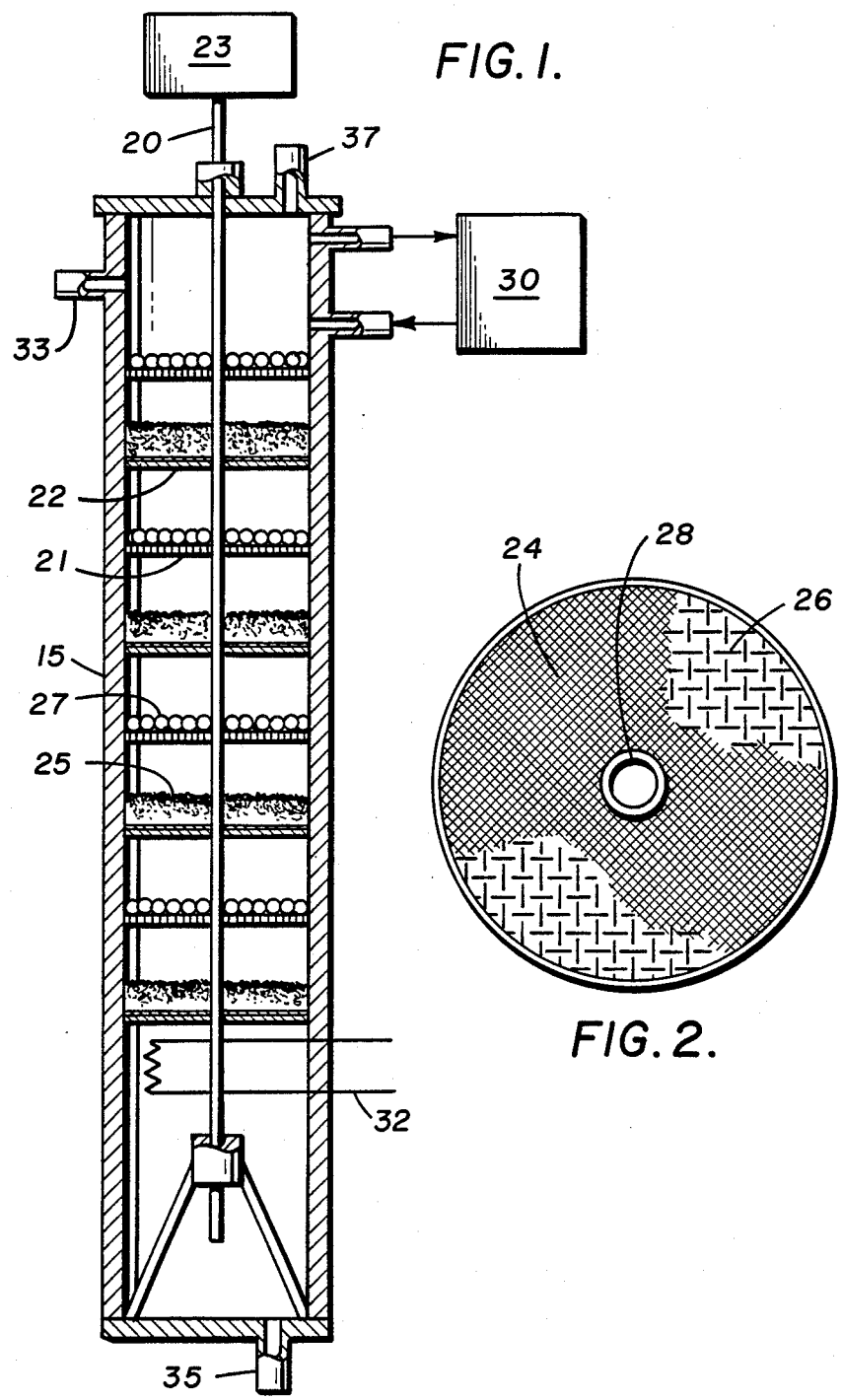

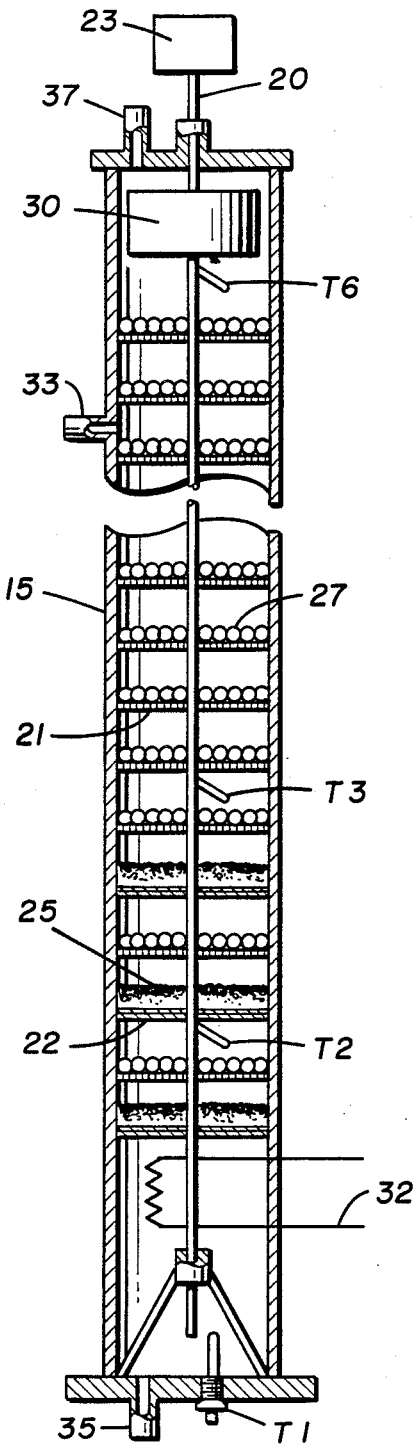

HIGH EFFICIENCY COLUMN CRYSTALLIZER

This is a continuation of Ser. No. 558,142, filed Dec. 5, 1983, now abandoned.

BACKGROUND OF THE INVENTION

The present invention relates to an improved countercurrent solid-liquid contacting apparatus, and more particularly to column crystallizer apparatus employing the use of crystal beds to suppress undesirable axial liquid mixing thereby increasing separation efficiency.

Column crystallizer apparatus are generally used for purifying organic mixtures by countercurrently contacting solute crystals and mother liquor. In a typical column crystallizer, moving internals such as screws, scrapers, trays or balls are employed to transport crystal solids from one end of the column to the other end where the crystals are melted. A portion of the crystal melt is withdrawn as product while the rest is refluxed. The column internals can also be used to promote mass transfer between crystal solids and mother liquor thereby decreasing the size of equilibrium stages.

For example, the column crystallizer disclosed in British Pat. No. 1,365,536 comprises a plurality of vibrating perforated plates positioned at spaced intervals in the column. A plurality of freely movable bodies are disposed on the surface of the perforated plates. The entire column assembly is subjected to vertical reciprocations so that the movable bodies agitate and bounce on the perforated plates. The action of the movable bodies comminute any crystal aggregates formed. A scraped surface cooling unit, located at the top of the column, produces the initial crop of crystals. A heating unit, located at the bottom, melts the purified crystals thereby permitting easy product recovery.

The effectiveness of the above-described apparatus in obtaining high purity crystals is limited due to axial liquid mixing in the column. Experimental evidence indicates that liquid on each side of a vibrating plate mixes due to flow through the plate perforations and the clearance between the plate circumference and the column wall. Axial liquid mixing causes impure mother liquor in the top of the column to travel downward and mix with purer crystal product melt in the bottom of the column, thereby greatly reducing the separation efficiency of the column. Axial liquid mixing can be reduced by operating with a more concentrated crystal slurry. However, operating at high crystal slurry concentrations inhibits the comminuting action of the movable bodies.

Axial liquid mixing is known to become more severe in large diameter columns. The designer of commercial scale crystallization equipment must also contend with the problems of liquid channeling and by-passing found in large diameter columns. Because of these difficult mixing problems, only limited success has been realized on scale-up of pilot plant column crystallizers to commercial size equipment.

It is the overall object of the present invention to provide an improved column crystallizer apparatus.

It is, therefore, an object of the present invention to provide a set of improved internals for reducing the axial liquid mixing in a column crystallizer apparatus.

It is another object of the present invention to provide an improved column crystallizer apparatus capable of efficiently crystallizing systems having small differences between solid and liquid densities.

It is still another object of the present invention to provide an efficient column crystallizer apparatus which can be economically scaled-up to commercial size.

These and other objects and advantages will become apparent to those skilled in the art from the following description and figures.

SUMMARY OF THE INVENTION

According to the present invention, there is provided an improved countercurrent solid-liquid contacting apparatus, and more particularly a high efficiency column crystallizer apparatus comprising a plurality of substantially horizontal perforated plates periodically attached to a vertical shaft located coaxially within a normally elongated vertical housing. Mobile bodies substantially cover the surface area of each perforated plate.

Crystal bed support trays are positioned at a predetermined distance below and substantially parallel to each perforated plate. Crystal bed support trays are attached to the inner wall of the crystallizer enclosure so that they are stationary with respect to the enclosure.

A compound excitation device adapted to produce two waveforms is attached to the vertical shaft. The first waveform is a low amplitude, high frequency waveform that results in the mobile bodies colliding with one another, the shaft the column wall and the perforated plate thereby comminuting crystal aggregates. The second waveform is a high amplitude, low frequency waveform that causes the perforated plate to lower to a predetermined level above the surface of the crystal bed support tray. The slow linear movement of the perforated plates provides positive transport of crystals within the column crystallizer by collecting the crystals on the leading side of the perforated plate when moving toward the crystal support tray adjacently below. Positive transport of crystals makes possible efficient crystallization in systems having small differences in density between crystals and mother liquor. The positive transport of crystals of the present invention also increases crystallizer throughput.

During the initial start-up, a crystal bed forms on the upper surface of each support tray having a bed thickness equal to the clearance between perforated plates and adjacent crystal bed support tray at the end of the downward stroke of the slow waveform. During steady-state operation, crystals are deposited at the upper surface of the crystal bed and an equal amount of crystals pushed through the support tray to the stage below. Hence, crystal bed thickness is maintained essentially constant while providing for positive transport of crystals down the crystallizer column.

The crystal beds reduce axial liquid mixing thereby preventing the impure mother liquor in the top of the column from traveling downward and mixing with purer crystal product melt in the bottom of the column and, as a result, increases the separation efficiency of the column crystallizer.

BRIEF DESCRIPTION OF THE DRAWINGS

FIG. 1 is a longitudinal, cross-sectional view of a high efficiency column crystallizer according to the present invention.

FIG. 2 is an overhead view of one embodiment of the crystal bed support tray according to the present invention.

FIG. 3 is a longitudinal, cross-sectional view of the experimental high efficiency column crystallizer according to the present invention.

DETAILED DESCRIPTION OF THE PREFERRED EMBODIMENTS

Referring to FIG. 1, there is shown one embodiment of the present invention wherein a vertical shaft 20 passes along the axis of crystallizer enclosure 15. A plurality of horizontal perforated plates 21 are attached to vertical shaft 20. Perforated plates 21 are fabricated so that the perforations are relatively small but large enough to allow crystals to pass therethrough. By describing the plates as perforated it is meant that the plates have apertures of any suitable cross-sectional shape such as round, elliptical, rectangular, square, triangular, etc. The perforated plates are sized so that their circumference is within about one-eighth inch of cylindrical enclosure 15. However, it should be understood that exact tolerances will depend on actual unit diameter and the cost of fabrication and erection. While the preferred embodiment herein described refers to perforated plates, it is evident to one skilled in the art that any sufficiently rigid semipermeable platen such as wire mesh platen and Johnson screens which comprise a matrix assembly of rigid metal bars can be used in the present invention.

While in the preferred embodiment a horizontal crystal bed support tray 22 is positioned at a predetermined distance below each perforated plate 21, it should be evident that fewer support trays may be used in a column crystallizer. Support trays 22 are secured to the inner wall of enclosure 15 so that trays 22 are stationary with respect to enclosure 15. However, for large diameter support trays contemplated for commercial size equipment it may be desirable to anchor the trays to a plurality of support members extending upward from the column base through apertures fabricated in the perforated plates and support trays. Support trays 22 are fabricated with central aperture so that vertical shaft 20 passes therethrough. The clearance between crystal tray 22 and vertical shaft 20 is preferably minimized to reduce the by-passing of mother liquor. Likewise, the clearance between the outer circumference of the trays and the inner wall of the enclosure is also minimized.

Vertical shaft 20 is attached to a compound excitation device 23 capable of transmitting reciprocating axial movement to the vertical shaft. Mobile bodies 27, preferably of spherical shape, are placed on each perforated plate 21. The mobile bodies cover greater than about 10% of the area of each perforated plate. In some instances it may be beneficial to have more than one layer of mobile bodies on selected perforated plates. Mobile bodies should be large enough not to penetrate the perforations in the horizontal plates or penetrate the clearance between the circumference of plate 21 and the inner wall of enclosure 15. It should be understood that the exact size and density of the mobile bodies, extent of plate coverage and materials of construction will necessarily depend on the specific application.

The compound excitation device 23 imparts two axial motion waveforms to shaft 20. One waveform, hereinafter called the fast waveform, is a high-frequency, low amplitude waveform which causes the mobile bodies to agitate and bounce on the perforated plates, impacting themselves, and the perforated plates thereby comminuting crystal aggregates. Repeated impacts of the mobile bodies also keep the plate surface, shaft and column walls free of incrustations. A suitable waveform for this motion is a sinusoidal waveform with amplitude of about 1 mm (2 mm peak to peak) and frequency of 25 hertz. However, it should be understood that other waveforms having other combinations of amplitude and frequency particularly non-sinusoidal waveforms may be used to impart an appropriate motion on the mobile bodies. Waveforms in which acceleration is constant are particularly preferred to minimize stresses in the equipment. The preferred amplitude range is from about 0.1 mm to about 10 mm, although higher or lower amplitude may be useful in specific applications. The frequency of the fast waveform must be at least great enough to overcome gravity and to cause the mobile bodies to bounce around and impact one another. Mechanical limitations set the practical upper limit which would approximately reside in the 40–200 hertz range. The preferred range is from the minimum to cause mobile bodies 25 to bounce to about 40 hertz. However, it should be understood that other comminuting means may be used in place of the mobile bodies. For example, a side stream of crystallizer slurry could be withdrawn from each crystallizer stage, the crystal aggregates contained therein comminuted by conventional mechanical grinding means, and then returned to the stage from which it was withdrawn. However, it should be evident to those skilled in the art that comminuting means will not, be required for all systems since crystals may be structurally weak and will break apart when impacted by the vibrating perforated plates.

The other waveform, hereinafter called the slow waveform, is a slower, larger amplitude waveform than the first waveform. The slower waveform causes perforated plates 21 to move periodically along the length of the column toward the adjacent stationary support tray 22 positioned below. The amplitude of this slow waveform is adjusted to leave a crystal bed 25 of predetermined thickness on the upper surface of support tray 22. The velocity of the slow waveform is preferably linear with displacement, although other waveforms are possible and in some instances may be preferred. The temporal duration of the upward and downward tray movements need not be equal. A longer duration for the upward than the downward is preferred. The preferred total duration for the slow waveform cycle is in the range of less than about one to more than three minutes although this is not considered critical. The preferred amplitude (peak to peak) is slightly less than the spacing between adjacent crystal bed support trays 22 minus the height of the mobile bodies minus the desired crystal bed thickness. The preferred bed thickness is in the range of one to four inches. It should be understood that other crystal bed thicknesses may be advantageous in some instances.

In the preferred embodiment, the fast waveform is not operated during the downward stroke of the perforated plates. During the downward stroke of the slow waveform, layers of crystals form on the lower surfaces of the plates occluding the perforations therethrough and permitting the deposit of the crystals from each stage onto the upper surface of the crystal bed support tray below. As crystals are deposited on the upper surface of the crystal bed support tray, an essentially equal amount of crystals are freed from the lower surface of the tray and pushed into the stage adjacently below thereby maintaining an essentially constant crystal bed thickness. The fast waveform is operated on the upward stroke of the slow waveform to cause plate vibration and mobile body agitation thereby opening plate perforations and comminuting crystals passed from the stage adjacently above. It should be understood that in some instances, such as when crystals settle unusually rapidly due to size and concentration, the fast waveform may need to be operated during the downward stroke of the slow waveform. It should be further understood that a pause at the end of the downward stroke of the slow waveform, during which the fast waveform is operated, may be required to break up possible formation of a hard crystal cake in the crystal bed and to push loose crystals through the crystal bed support tray to the stage adjacently below.

Referring to FIG. 2, there is shown one embodiment of the stationary crystal bed support tray of the present invention. Crystal trays 22 have a larger open area and larger hole size than perforated plates 21. Typically, a perforated plate has about 50% open area and a hole diameter of the order of 5/64 inches. The preferred open area of the crystal tray 22 is in the range of about 40% to 80%. The preferred individual hole area of the crystal tray is about 2 to 4 times the individual hole area of the perforated plate.

Crystal tray 22 comprises a thin wire screen 24 supported from underneath by support grid 26. The wire diameter of the fine wire screen should be as small as possible to allow maximum open area while maintaining sufficient mechanical strength to prevent wire screen 24 from tearing during use. Support grid 26 is made of heavier wire than wire screen 24 to provide sufficient mechanical strength to backstop the fine wire screen against the impact delivered during the downward stroke of the perforated plate adjacently above. An opening 28 conforming to the cross-sectional shape of shaft 20 is fabricated in crystal tray 22 for vertical shaft 20 to pass therethrough. Opening 28 should be slightly larger than the shaft size so that the shaft can move inside the opening without restriction while minimizing the by-passing of mother liquor.

Referring again to FIG. 1, a cooling unit 30, for example, a scraped surface cooling unit as disclosed in *Chemical and Process Eng.*, 1970, 51 (11) pp. 59-65, is positioned in fluid communication with the top of enclosure 15. The mother liquor to be crystallized is withdrawn from a point near the top of the column and fed to cooling unit 30. The resulting crystal slurry exiting therefrom is returned to the column at a point below that from which the mother liquor was withdrawn. While the embodiment exemplified herein is described with reference to an external cooling unit it should be understood that the cooling unit may be positioned on the interior of the crystallizer enclosure. Suitable internal cooling units include a cooling coil kept free of incrustation by ultrasonic means and scraped surface cooling units. Cooling unit 30 produces the initial crop of crystals which is purified as it passes down the crystallizer column. In the preferred continuous countercurrent operation, solution to be crystallized is fed to the crystallizer column continuously through solution inlet port 33. While it is evident to one skilled in the art that the feed solution should be introduced into the column where it most nearly matches the mother liquor composition, it may be introduced in other places and is most often fed into the cooling unit. Purified crystals are melted by heating unit 32 and removed as crystal product melt through crystal product melt outlet port 35. Mother liquor is withdrawn through mother liquor outlet port 37.

To operate the above-described crystallizer, one closes the crystal melt outlet port 35, fills enclosure 15 with solution to be crystallized through feed solution inlet port 33 and then starts the compound excitation device. Next, one starts the flow of cooling fluid through cooling unit 30. After sufficient heat has been removed nucleation will occur and crystals formed will begin passing down the column. Total crystal melt reflux is maintained until a steady-state thickness of crystals is accumulated in each crystal bed. After a reasonably short time to ensure steady-state crystal bed formation, fresh feed is added through inlet port 33 and mother liquor withdrawn through outlet port 37. Partial reflux operation is now maintained wherein a part of the crystal product melt is withdrawn and the remainder of the crystal product melt is returned to the bottom of the column and passed upward as reflux to the top of the column. In this way, a concentration gradient is maintained along the crystallizer length as in fractional distillation. It is evident to those skilled in the art that partial reflux can be easily accomplished by only removing a portion of the crystal melt and permitting the remainder to travel up the column. It is further evident that the steady-state crystal melt reflux ratio will vary with the product purity desired and column length as in fractional distillation and that the steady-state reflux ratio will vary with the solution to be crystallized.

While the present invention has been described with respect to countercurrent crystallizer apparatus, it will be understood by those skilled in the art that the present invention is equally applicable to other countercurrent solid-liquid contacting apparatus such as leaching apparatus. The stationary solid beds and transport means of the present invention would likewise increase the efficiency of conventional leaching apparatus by decreasing liquid axial back-mixing while promoting positive transport of solids. In leaching apparatus there would not necessarily be a need for comminuting means since the solids do not increase in size as in crystallization. Moreover, while the present invention has been described with reference to systems wherein the solid phase is more dense than the liquid phase, it will be evident to those skilled in the art that the present invention can be easily adapted to accommodate systems wherein the solid phase is less dense than the liquid phase and, therefore, is considered within the scope of the present invention. In such a situation, one would only need to invert the column crystallizer structure. That is, the cooling unit would be located in the lower portion of the column along with the feed inlet port. The crystal melt outlet port and melting means would be positioned in the top of the column and the mother liquor exit port in the bottom of the column. Crystals would collect on the under-side of the support trays and be transported to the stage adjacently above by the upward motion of the perforated plates. Comminuting means, if needed, may be accomplished by side-stream withdrawal and conventional grinding as described above.

It should be further understood that the above-described preferred embodiment is not intended to limit the scope of the present invention. Rather, it is evident that one skilled in the art could make various engineering and fabrication modifications in constructing a commercial scale crystallizer unit while not departing from the spirit and scope of the present invention.

EXAMPLE

A perforated plate column crystallization apparatus with and without stationary crystal bed support trays as described above was used to purify a mixture of para-dichlorobenzene (p-DCB) and ortho-dichlorobenzene (o-DCB). The column employed a set of vertical scraped surface cooling tubes in fluid communication with the top of the column for making crystals and a heating coil in the bottom of the column for melting the purified crystals. Specifications for the column crystallizer are given below in Table I.

Case I represents the original column without stationary crystal bed support trays. Case II represents the modified column containing three support trays in place of three perforated plates. An illustration of the modified column of Case II is shown in FIG. 3.

TABLE I

| Case-I | | |
|---|---|---|
| Column | | |
| | Material | glass |
| | I.D. | 10.16 cm |
| | Overall height | 198.12 cm |
| Perforated Plates | | |
| | Material | stainless steel |
| | No. of plates | 13 |
| | Perforations | |
| | diameter | 2 mm |
| | pitch | triangular on 3 mm centers |
| | Thickness | 1.59 mm |
| | Spacing | 101.6 mm |
| Mobile Bodies | | spheres |
| | Material | stainless steel |
| | No. of spheres/tray | 95 |
| | diameter | 9 mm |
| Fast Waveform | | Sinusoidal |
| | Frequency | 25 Hz |
| | Amplitude | 2 mm peak to peak |
| Slow Waveform | | linear |
| | Stroke | 101.6 mm peak to peak |
| | Upward Speed | 5.08 mm/second |
| | Downward Speed | 18.54 mm/second |
| | Pause at downward limit | 2 seconds |

Case II

Case II equipment is the same as Case I except that the first, third and fifth perforated plates and balls thereon were removed and three stationary crystal bed support trays as described below were installed in the vacant spaces.

| Stationary Crystal Bed Support Trays | |
|---|---|
| Material | stainless steel |
| Wire Screen | 6 mesh |
| Wire Diameter | 0.71 mm |
| Opening (square) | 3.53 mm |
| Support Grid | 2 mesh |
| Wire Diameter | 3.05 mm |
| Opening | 9.65 mm |

The solution to be crystallized consisting of p-DCB and o-DCB was fed to the above-described column. The column was operated in both total reflux and continuous feed modes. Experimental results are summarized in Table II and Table III.

Runs 1, 2 and 3 were run on the crystallizer column as described in Case I of Table I. Runs 4, 5 and 6 were run on the modified crystallizer column as described in Case II of Table I. After reaching steady-state operation, a crystal bed about 2 inches thick was maintained on the upper surface of each crystal bed support tray.

The most reliable indication of the effect of the crystal beds on the separation efficiency of the experimental column is the change in the temperature gradient in the vicinity of the crystal beds. A steeper temperature gradient indicates better separation efficiency. Temperature measurements T1 through T6 were obtained for Run 1 through 6 at intervals from the bottom to the top of the column as shown in FIG. 3. Special attention is directed to temperature T2 and T3 shown in Table II since these measurements were taken at points in the column directly above and below the location of the crystal beds in the modified column.

TABLE II

| | Temperature (°C.) | | | | | |
|---|---|---|---|---|---|---|
| Run | T1 | T2 | T3 | T4 | T5 | T6 |
| 1 | 53.0 | 45.5 | 43.0 | 39.5 | 36.0 | 24.5 |
| 2 | 53.0 | 52.5 | 52.0 | 50.2 | 49.0 | 46.5 |
| 3 | 53.0 | 52.8 | 50.0 | 47.0 | 45.0 | 43.0 |
| 4 | 54.0 | 52.5 | 44.0 | 42.0 | 38.0 | 30.0 |
| 5 | 53.5 | 50.5 | 43.5 | 42.0 | 39.0 | 22.0 |
| 6 | 53.0 | 53.5 | 44.0 | 42.5 | 40.5 | 34.0 |

As shown in Table II, a consistent improvement in separation efficiency was observed in this area of the modified column as evidenced by the steeper temperature gradients between temperature measurement T2 and T3. The differences between measurements T2 and 3 for Runs 4, 5 and 6 (modified column) were all between 7° and 9° C., while Runs 1, 2 and 3 (original column) showed differences between 0.5° and 2.8° C.

Table III shows the overall mass balance for Runs 1 through 6. The most significant improvement can be observed by comparing the increases in product purity between feed and product in continuous feed Runs 3 and 5. In Run 5 with the modified column the purity of p-DCB was increased from 74.7% in feed to 98.5% in bottom product, while in Run 3 with the original column, the increase was only from 90.4% in feed to 95.7% in bottom product.

It is evident to those skilled in the art that the increased column temperature gradient and corresponding increased separation efficiency described above can be further enhanced when additional crystal bed support trays are used in the upper part of the crystallizer column.

TABLE III

| | | | Flow Rate (lb/hr) | | | Concentration (% p-DCB) | | | |
|---|---|---|---|---|---|---|---|---|---|
| Run | Equipment Description | Operation Mode | Feed | Product | Mother liquor | Feed | Product | Mother Liquor | Cooling Fluid, (°C.) |
| 1 | Case I | Total Reflux | 0 | 0 | 0 | 75.0 | 96.9 | — | −4 |
| 2 | Case I | Continuous | 8.0 | 6.0 | 2.0 | 91.0 | 95.5 | 82.4 | 31.5 |

TABLE III-continued

| | | | Flow Rate (lb/hr) | | | Concentration (% p-DCB) | | | |
|---|---|---|---|---|---|---|---|---|---|
| Run | Equipment Description | Operation Mode | Feed | Product | Mother liquor | Feed | Product | Mother Liquor | Cooling Fluid, (°C.) |
| 3 | Case I | Continuous | 8.0 | 6.0 | 2.0 | 90.4 | 95.7 | 75.1 | 17.5 |
| 4 | Case II | Total Reflux | 0 | 0 | 0 | 75.0 | 97.8 | — | 5.5 |
| 5 | Case II | Continuous | 11.5 | 6.0 | 5.5 | 74.7 | 98.5 | 48.3 | 2.5 |
| 6 | Case II | Total Reflux | 0 | 0 | 0 | 75.0 | 96.6 | — | 19 |

We claim:

1. A column crystallization apparatus comprising in combination:
   (a) a crystallizer housing having conduit means for ingress of solution to be crystallized, conduit means for recovery of mother liquor and conduit means for recovery of product crystal melt;
   (b) a cooling means in fluid communication with the top portion of said housing adapted to generate crystals;
   (c) a plurality of platens positioned at predetermined intervals along and essentially perpendicular to the major axis of said housing, said platens substantially conforming to the interior shape of said housing and having apertures of sufficient size to permit passage of crystals and solution therethrough;
   (d) at least one support member fixed to said platens such that said platens are maintained in position described in part (c), said member being capable of translational movement along the length of the crystallizer;
   (e) a crystal bed support means stationarily positioned at a predetermined distance below said platens and substantially parallel to said platens, said support means adapted to support a crystal bed and having an aperture to permit the platen support member to pass therethrough and having apertures of sufficient size to permit solution to pass therethrough and crystals to pass therethrough by movement of an adjacent platen;
   (f) a first excitation means cooperating with said platen support member and adapted to impart a first waveform to cause said semipermeable platens to vibrate thereby aiding the passage of crystals therethrough;
   (g) a second excitation means cooperating with said support member and adapted to impart a second waveform to cause slow translational movement of said platens for positive transport of crystals; and
   (h) melting means in fluid communication with the bottom portion of said housing adapted to melt purified crystals from the bottom of said crystallizer housing.

2. The column crystallizer apparatus of claim 1 further comprising comminuting means positioned near the upper surface of said platens capable of breaking up crystal aggregates so that the crystals can pass through said platens.

3. The apparatus of claim 2 in which the cooling means is positioned externally with respect to the crystallizer housing.

4. The apparatus of claim 2 in which the cooling means is positioned internally with respect to the crystallizer housing.

5. The apparatus of claim 3 in which the externally mounted cooling means has a conduit means for ingress of solution to be crystallized.

6. The apparatus of claim 2 in which the comminuting means is a plurality of mobile bodies set in agitating motion by the first excitation means.

7. The apparatus of claim 2 in which the semipermeable platens are perforated plates.

8. The apparatus of claim 2 in which the first excitation means is adapted to impart a first waveform having an amplitude between about 0.1 mm and 10 mm.

9. The apparatus of claim 2 in which the first excitation means is adapted to impart a first waveform having a frequency less than about 200 hertz.

10. The apparatus of claim 2 in which the second excitation means is adapted to impart a second waveform having a peak to peak amplitude substantially equal to the free axial spacing between adjacent crystal bed support trays minus the crystal bed thickness.

11. The apparatus of claim 6 in which the mobile bodies are substantially spherical in shape.

12. The apparatus of claim 6 in which mobile bodies cover at least about ten percent of the upper surface area of said semipermeable platens.

13. A crystal purifying apparatus comprising in combination:
   (a) a housing having conduit means for ingress of crystal slurry, conduit means for recovery of mother liquor and conduit means for recovery of product crystals;
   (b) a plurality of platens positioned at predetermined intervals along and essentially perpendicular to the major axis of said housing, said platens substantially conforming to the interior shape of said housing and having apertures of sufficient size to permit passage of crystals and solution therethrough;
   (c) at least one support member fixed to said platens such that said platens are maintained in position described in part (b), said member being capable of translational movement along the length of the crystallizer;
   (d) a crystal bed support means stationarily positioned at a predetermined distance below said platens and substantially parallel to said platens, said support means adopted to support a crystal bed and having an aperture to permit the platen support member to pass therethrough and having apertures of sufficient size to permit solution to pass therethrough and crystals to pass therethrough by movement of an adjacent platen;
   (e) a first excitation means cooperating with said platen support member and adapted to impart a first waveform to cause said semipermeable platens to vibrate thereby aiding the passage of crystals therethrough; and
   (f) a second excitation means cooperating with said support member and adapted to impart a second waveform to cause slow translational movement of said platens for positive transport of crystals.

* * * * *